United States Patent [19]

Bachmann

[11] 3,826,377

[45] July 30, 1974

[54] FIXTURE FOR HOLDING SEMICONDUCTOR DISCS DURING DIFFUSION OF DOPING MATERIAL

[75] Inventor: Gerhard Bachmann, Muenchen, Germany

[73] Assignee: Siemens Aktiengesellschaft, Berlin and Munich, Germany

[22] Filed: June 13, 1972

[21] Appl. No.: 262,353

[30] Foreign Application Priority Data

July 7, 1971 Germany............................ 2133876

[52] U.S. Cl...................... 211/41, 148/149, 206/328

[51] Int. Cl............................................... A47g 19/08

[58] Field of Search...... 211/41, 40; 206/0.80, 0.84, 206/62 R, 46 FR, 1 R, 65 R, 46 ED; 148/189; 312/12

[56] References Cited

UNITED STATES PATENTS

| | | | |
|---|---|---|---|
| 1,480,939 | 1/1924 | Hand | 211/40 UX |
| 1,755,074 | 4/1930 | Ray | 312/10 |
| 2,354,872 | 8/1944 | Mitnick | 211/40 UX |
| 2,572,355 | 10/1951 | Kintz | 211/41 |
| 2,593,927 | 4/1952 | Slattery | 211/40 |
| 3,480,151 | 11/1969 | Schmitt | 211/41 |
| 3,484,662 | 12/1969 | Hagon | 148/175 UX |
| 3,644,154 | 2/1972 | Hoogendoorn | 148/189 X |
| 3,665,790 | 5/1972 | Jones | 206/46 ED UX |

FOREIGN PATENTS OR APPLICATIONS

| | | | |
|---|---|---|---|
| 1,532,497 | 6/1968 | France | 211/41 |
| 691,450 | 5/1940 | Germany | 206/0.84 |

*Primary Examiner*—Roy D. Frazier
*Assistant Examiner*—Abraham Frankel
*Attorney, Agent, or Firm*—Hill, Gross, Simpson, Van Santen, Steadman, Chiara & Simpson

[57] ABSTRACT

A fixture for retaining semiconductor discs during diffusion with a doping material including a hollow member with base and sidewalls, and a base plate located on the base of the hollow member with grooves therein for receiving the semiconductor discs in standing relation, in combination with retainer means extending between the sidewalls, the retainer means having slots therein for embracing the semiconductor discs in edge contact at a level which is at least as high as the center of gravity of the discs.

3 Claims, 3 Drawing Figures

PATENTED JUL 30 1974 3,826,377

FIXTURE FOR HOLDING SEMICONDUCTOR DISCS DURING DIFFUSION OF DOPING MATERIAL

BACKGROUND OF THE INVENTION

1. Field of the Invention

This invention is in the field of support structures for positioning semiconductor discs in a furnace during diffusion treatment with a doping material to prevent slumping or deformation of the discs during the high temperature treatment, the support means being arranged to hold the discs while they are standing on end with a minimum amount of contact between the discs and the support structure, thereby minimizing the possibility of contamination.

2. Description of the Prior Art

The treatment of semiconductor discs by vapor diffusion processes in order to achieve a controlled amount of impurity concentration is carried out at high temperatures. In the case of semiconductor discs composed of silicon, the temperatures are approximately 1,050° to 1,250°C. In this temperature range, the semiconductor discs are readily deformable. Plastic deformation of this type may lead to disturbances in the crystal lattice which have an adverse effect on the electrical characteristics of the semiconductor.

It has heretofore been proposed to support semiconductor discs by seating them in grooves of a refractory base, but in this type of arrangement, the discs can easily tilt from a normally vertical position. When this occurs, the weight of the discs can exert a bending moment, and dislocations and disturbances in the crystal lattice will occur.

SUMMARY OF THE INVENTION

This invention relates to a fixture for retaining semiconductor discs in position for diffusion of the doping material and includes a hollow member having a base and sidewalls, a base plate consisting of semiconductor material located along the base of the hollow member, the base plate having grooves therein accommodating a semiconductor disc in standing relation on its edge, and spaced retainer means extending between the sidewalls, the retainer means providing slots parallel to the grooves in the base plate and being located at a level which is at least as high as the center of gravity of the disc which is to be retained therein.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
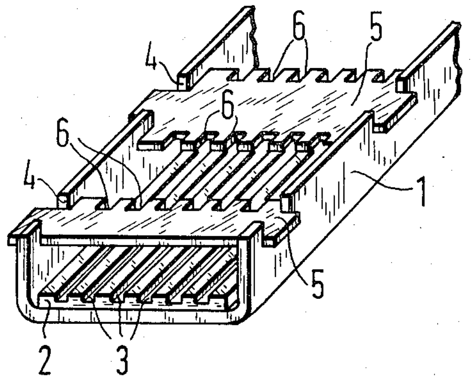
FIG. 1 is a view in perspective of a fixturing device of the type which may be employed for the purposes of the present invention.

In FIG. 1, reference numeral 1 has been applied to an open-ended fixture of generally channel-shaped cross-section including a base and opposed sidewalls. A base plate 2 is positioned on the base of the fixture 1 and is provided at its upper surface with a number of parallel grooves 3. Pairs of opposed slots 4 are provided in the sidewalls of the fixture 1 to receive the ends of a plurality of retaining means such as strips 5 in seated relation. The strips 5 are provided with slots 6 which extend in overlying parallel relationship to the grooves 3. The semiconductor discs are inserted into the grooves 6 between an adjacent pair of plates 5 with their bottom edges resting in one of the grooves 3. The discs are thus positioned with virtually only line contact with the grooves 3 and edge contact at their periphery with the slots 6. The strips 5 are located so that the points of contact with the discs exist at least as high as the center of gravity or higher. This arrangement insures that the semiconductor discs will not be mechanically stressed during diffusion to a degree which would lead to dislocations in the crystal structure of the discs. Accordingly, semiconductor discs which are dislocation free before diffusion remain dislocation free upon completion of the diffusion process.

The base plate 2 and the plates 5 consist of the same semiconductor material as the semiconductor discs into which diffusion is to take place. The plates 5, for example, can be sawed out of silicon discs which have been cut from a rod of silicon. The fixture body 1 itself may also consist of silicon. To produce such a body, it is desirable to start from a silicon tube with a substantially rectangular cross-section and sawing appropriate lengths from such a tube. The seating grooves 4 can also be provided by sawing. The tube made of semiconductor material can be produced by pyrolytic decomposition of a gaseous compound of a semiconductor material on a heated graphite rod. For a fixture composed of silicon, silicochloroform, $SiHCl_3$, and hydrogen gas can be directed over a graphite member which is heated to a temperature of approximately 1,450°C. The silicochloroform reacts with the hydrogen resulting in the deposition of crystalline silicon on the graphite member. When a sufficient thickness has been built up, on the order of 1 to 5 millimeters, the carrier form is then cooled. Because of its higher thermal coefficient of expansion, the graphite form shrinks more than the silicon layer and can therefore be withdrawn from the resulting silicon tube without effort.

It is also possible to make the fixture 1 from quartz. Since the semiconductor discs come into contact only with parts consisting of semiconductor material, the danger of contamination by the quartz is minimized.

Figure 2:
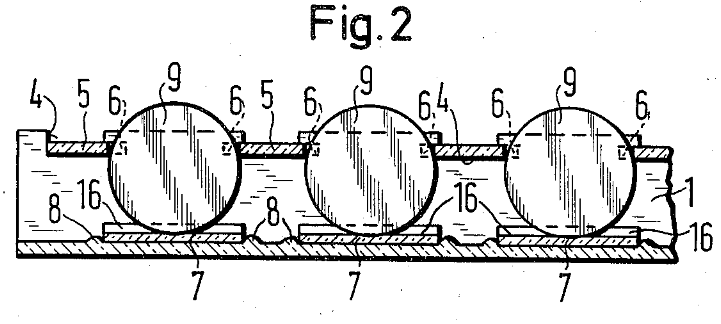
FIG. 2 is a longitudinal cross-sectional view of a modified form of fixturing device which may be employed.

In the form of the invention shown in FIG. 2, the same reference numerals have been applied to corresponding elements as in FIG. 1. In this embodiment, however, separate base plates 7 are provided extending across the width of the fixture 1. Each of the base plates 7 has a plurality of grooves 16 extending in spaced relation across the base of the fixture 1. The base plates 7 are held in alignment by means of ribs 8 which extend the width of the base of the fixture 1. The semiconductor discs, identified at reference numeral 9, are positioned with their bottom edges located in the slots 16, and are embraced by the parallel slots 6 in the plates 5 as shown in FIG. 2. The plates 5 and the base plates 7 consist of the same material as the semiconductor discs 9. The fixture 1 in this case may also consist of either quartz or may be of the same semiconductor material as the discs 9. If the fixture 1 consists of quartz, the ribs 8 may be formed by fusion melting of small quartz rods along the base of the fixture. If the fixture 1 consists of semiconductor material, the ribs 8 are preferably created simultaneously with the production of the semiconductor tube (as previously explained) by correspondingly shaping the graphite carrier member. In this case, the semiconductor tube has to be severed before removal of the carrier member, since the graphite carrier member cannot be withdrawn because of the presence of the ribs 8. The advantage of the embodiment of FIG. 2 over that of FIG. 1 is that the base plates 7 are relatively small and therefore they can be easily produced by sawing from a semiconductor disc.

Figure 3:
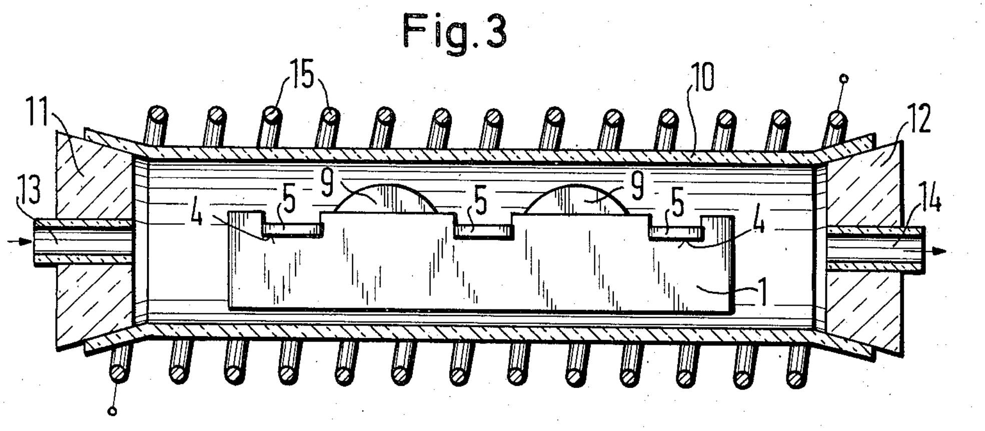
FIG. 3 is a longitudinal cross-sectional view of a fixturing device according to the present invention included within a diffusion furnace.

FIG. 3 is a somewhat schematic showing of an arrangement for diffusion treatment employing the fixtures of the present invention. The diffusion oven consists generally of a tube 10 which is closed off by two plugs 11 and 12. The tube 10 and the plugs 11 and 12 may consist of quartz or of a semiconductor material such as silicon. The plug 11 has an inlet 13 and the plug 12 has an outlet 14 through which the vaporized dopant, together with a protective gas such as nitrogen, is passed through the furnace. The tube 10 is surrounded by a winding 15 which heats the tube 10 and the semiconductor discs 9 to a diffusion temperature by radiant heat. When the tube 10 consists of semiconductor material, the winding 15 is supplied with high frequency induction currents. The tube 10 will thereupon be heated inductively and will radiate heat at the semiconductor discs 9.

With the fixture of the present invention, the various component parts can be kept relatively small so that in case of damage, these elements can be replaced without substantial expense.

While the invention has been described primarily in conjunction with the treatment of silicon discs, it should also be evident that the invention is also applicable to semiconductor discs made of germanium or other semiconductor materials, such as Group 3-Group 5 compounds or Group 2-Group 6 semiconductor compounds.

It will also be evident that various modifications can be made to the described embodiments without departing from the scope of the present invention.

I claim as my invention:

1. An apparatus for holding semiconductor discs for the diffusion of doping material therein which comprises a U-shaped container having sidewalls and a base, a base plate on said base having grooves in its upper surface, said grooves being parallel to each other and parallel to the longitudinal axis of said container, the width of the grooves enabling said discs to stand therein, said container having recesses therein, at least one holding strip composed of the same semiconductor material as said discs said strip extending transversely of said longitudinal axis, the ends of said strip having end portions resting in said recesses, said holding strip having slots which extend parallel to the grooves in said base plate, the recesses in said sidewalls being sufficiently spaced from said base plate that said slots embrace the semiconductor discs at least as high as the center of gravity of said discs.

2. The apparatus of claim 1 in which said holding strip and the base plate are composed of silicon.

3. The apparatus of claim 1 in which said U-shaped container is composed of silicon.

* * * * *